(12) United States Patent
Johnson

(10) Patent No.: US 11,548,723 B2
(45) Date of Patent: Jan. 10, 2023

(54) PORTABLE DIVIDED STORAGE VESSEL

(71) Applicant: Jeremiah Johnson, Sulphur, OK (US)

(72) Inventor: Jeremiah Johnson, Sulphur, OK (US)

(*) Notice: Subject to any disclaimer, the term of this patent is extended or adjusted under 35 U.S.C. 154(b) by 104 days.

(21) Appl. No.: 17/244,614

(22) Filed: Apr. 29, 2021

(65) Prior Publication Data

US 2021/0347562 A1 Nov. 11, 2021

Related U.S. Application Data

(60) Provisional application No. 63/020,674, filed on May 6, 2020.

(51) Int. Cl.
| | | |
|---|---|---|
| *B65D 88/12* | (2006.01) | |
| *B65D 90/00* | (2006.01) | |
| *B65D 90/24* | (2006.01) | |
| *B65D 90/18* | (2006.01) | |

(52) U.S. Cl.
CPC ....... *B65D 88/128* (2013.01); *B65D 90/0006* (2013.01); *B65D 90/0066* (2013.01); *B65D 90/18* (2013.01); *B65D 90/24* (2013.01); *B65D 2588/12* (2013.01); *B65D 2588/54* (2013.01)

(58) Field of Classification Search
CPC . B65D 1/36; B65D 1/24; B65D 7/065; B65D 88/38; B65D 88/748; B65D 47/26; B65D 88/128; B65D 90/0006; B65D 90/0066; B65D 90/18; B65D 90/24; B65D 2588/12; B65D 2588/54; B09C 1/00
See application file for complete search history.

(56) References Cited

U.S. PATENT DOCUMENTS

| | | | | |
|---|---|---|---|---|
| 4,359,958 A * | 11/1982 | Durant | .................... | B63B 25/16 114/74 A |
| 5,285,604 A * | 2/1994 | Carlin | .................... | E04H 1/1205 52/36.2 |
| 5,524,769 A * | 6/1996 | Spencer | .................. | B03B 9/063 209/288 |
| 6,432,303 B1 * | 8/2002 | Chesner | ................. | B01D 61/16 210/257.2 |
| 7,908,791 B1 * | 3/2011 | Brash | ................... | A01M 13/003 43/125 |
| 8,486,345 B1 * | 7/2013 | Westrum | ................... | A61L 2/06 422/292 |
| 8,756,857 B2 * | 6/2014 | DeMonte | ............ | A01M 1/2094 43/132.1 |
| 9,539,623 B2 * | 1/2017 | Dear | ........................ | B08B 9/08 |
| 10,377,206 B2 * | 8/2019 | Kehoe | .................... | B60H 1/008 |
| 10,766,164 B2 * | 9/2020 | Philipp | ................ | B27K 5/0075 |
| 2003/0118474 A1 * | 6/2003 | Brash | ................... | A01M 13/003 422/1 |
| 2007/0163435 A1 * | 7/2007 | Brash | .................... | A23L 3/3409 96/108 |

(Continued)

*Primary Examiner* — Kareen K Thomas
(74) *Attorney, Agent, or Firm* — Crowe & Dunlevy, P.C.

(57) ABSTRACT

A storage vessel includes a body, two or more internal chambers or sections which may hold fluids or debris, one or more bulkheads 108 within the body of the storage vessel to separate the sections, and a roll off attachment apparatus. The storage vessel also comprises a series of ports and hatches to provide access to the sections within the storage vessel. The storage vessel can be moved to and from excavation sites using the roll off attachment apparatus which allows the storage vessel to be attached to or lifted onto a truck.

20 Claims, 3 Drawing Sheets

(56) References Cited

U.S. PATENT DOCUMENTS

| | | | | |
|---|---|---|---|---|
| 2007/0283986 | A1* | 12/2007 | Baum | A47L 11/34 |
| | | | | 134/201 |
| 2008/0066642 | A1* | 3/2008 | Forbes | B61D 7/22 |
| | | | | 105/247 |
| 2008/0257893 | A1* | 10/2008 | Podd | B29C 41/04 |
| | | | | 220/562 |
| 2008/0257894 | A1* | 10/2008 | Podd | B65D 90/041 |
| | | | | 134/42 |
| 2009/0211148 | A1* | 8/2009 | McCarty | A01M 19/00 |
| | | | | 29/401.1 |
| 2013/0340444 | A1* | 12/2013 | Bryant | F25D 29/001 |
| | | | | 62/62 |

* cited by examiner

PORTABLE DIVIDED STORAGE VESSEL

CROSS REFERENCE TO RELATED APPLICATIONS

This application claims the benefit of U.S. Provisional Patent Application No. 63/020,674 filed on May 6, 2020, and incorporates said provisional application by reference in its entirety into this document as if fully set out at this point.

BACKGROUND OF THE INVENTION

1. Field of the Invention

This invention relates generally to hydroexcavation, and more particularly, but not by way of limitation, to storage vessels for hydroexcavation fluid and debris.

2. Description of the Related Art

Hydroexcavation is the process of removing soil and debris with pressurized water and a vacuum. Pressurized water is used to loosen the soil and debris. The loosened soil and debris then mix with the water to form mud which can be mobilized. The mud is then removed from the excavation site with a vacuum. Hydroexcavation allows soil and debris to be removed without the risk of damaging buried pipe and utilities through mechanical drilling, machine assisted digging, or otherwise using conventional digging tools.

Hydroexcavators are commonly attached to trucks along with storage tanks for water and the excavated mud. The storage tanks are generally integrated into the truck and cannot be removed. When the hydroexcavator runs out of water or when the storage tank for the excavated mud is filled, the truck must leave the excavation site to dump the mud and refill the water before returning to complete the excavation. When the excavation is complete, the hydroexcavator may again be required to empty the storage tank and refill the water tank. The need to stop hydroexcavation and travel to refill and empty storage tanks on the hydroexcavator leads to significant downtime. This downtime limits the efficiency and decreases the value of the hydroexcavator. There is, therefore, a need for a portable storage vessel independent of a hydroexcavator with a size and configuration that can provide excavation fluid to and store excavated debris from a hydroexcavator. It is to these and other objectives that the present invention is directed.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

A storage vessel has a body, two or more internal chambers or sections configured to provide storage for excavation fluids and debris from hydroexcavation, a bulkhead to separate the sections, and a roll off attachment apparatus. The sections may be separated by an angled bulkhead. A series of ports and hatches are integrated into body of the storage vessel to provide access to the fluid and debris stored within the storage vessel. The storage vessel can be connected to a hydroexcavator to provide a supply of excavation fluid to the hydroexcavator and a vessel for excavated debris from the hydroexcavator during excavation. The storage vessel can be set up and removed from an excavation site independent of a hydroexcavator. In some embodiments the storage vessel may have more than two sections.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
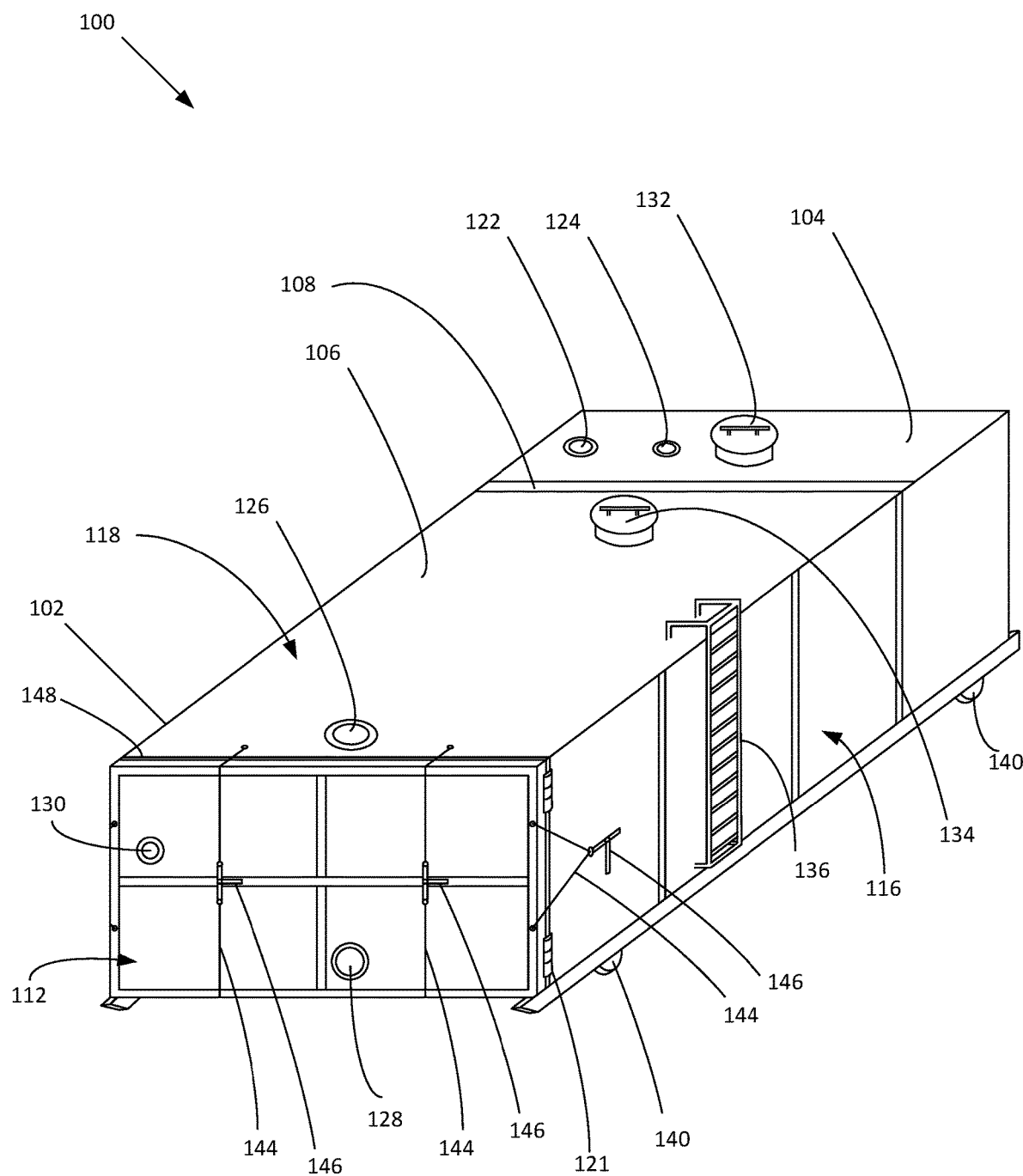
FIG. 1 is a perspective view of a storage vessel constructed in accordance with an exemplary embodiment.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

A storage vessel 100 includes a body 102 that has two or more internal chambers or sections, a bulkhead 108 within the body 102 of the storage vessel 100 to separate the sections, and a roll off attachment apparatus. The internal sections include a fluid section 104 and a debris section 106. The fluid section 104 holds a fluid for use in hydroexcavation. The debris section 106 holds excavated debris from an excavation site. The bulkhead 108 is connected to the body 102 of the storage vessel 100 and separates the debris and excavation fluid stored in the storage vessel 100. The storage vessel 100 also comprises a series of ports and hatches to provide access to the fluid and debris stored within the storage vessel 100. The bulkhead 108 may be angled to promote debris to drain from the debris section 106. The storage vessel 100 can be moved to and from excavation sites using the roll off attachment apparatus which allows the storage vessel 100 to be attached to or lifted onto a truck.

Additional sections and bulkheads may be necessary where different excavation fluids are required for a hydroexcavation job. Additional sections may also be needed where it is necessary to separate debris from hydroexcavation. In such cases, the additional bulkheads prevent mixing of fluids stored in the sections of the storage vessel 100.

Figure 2:
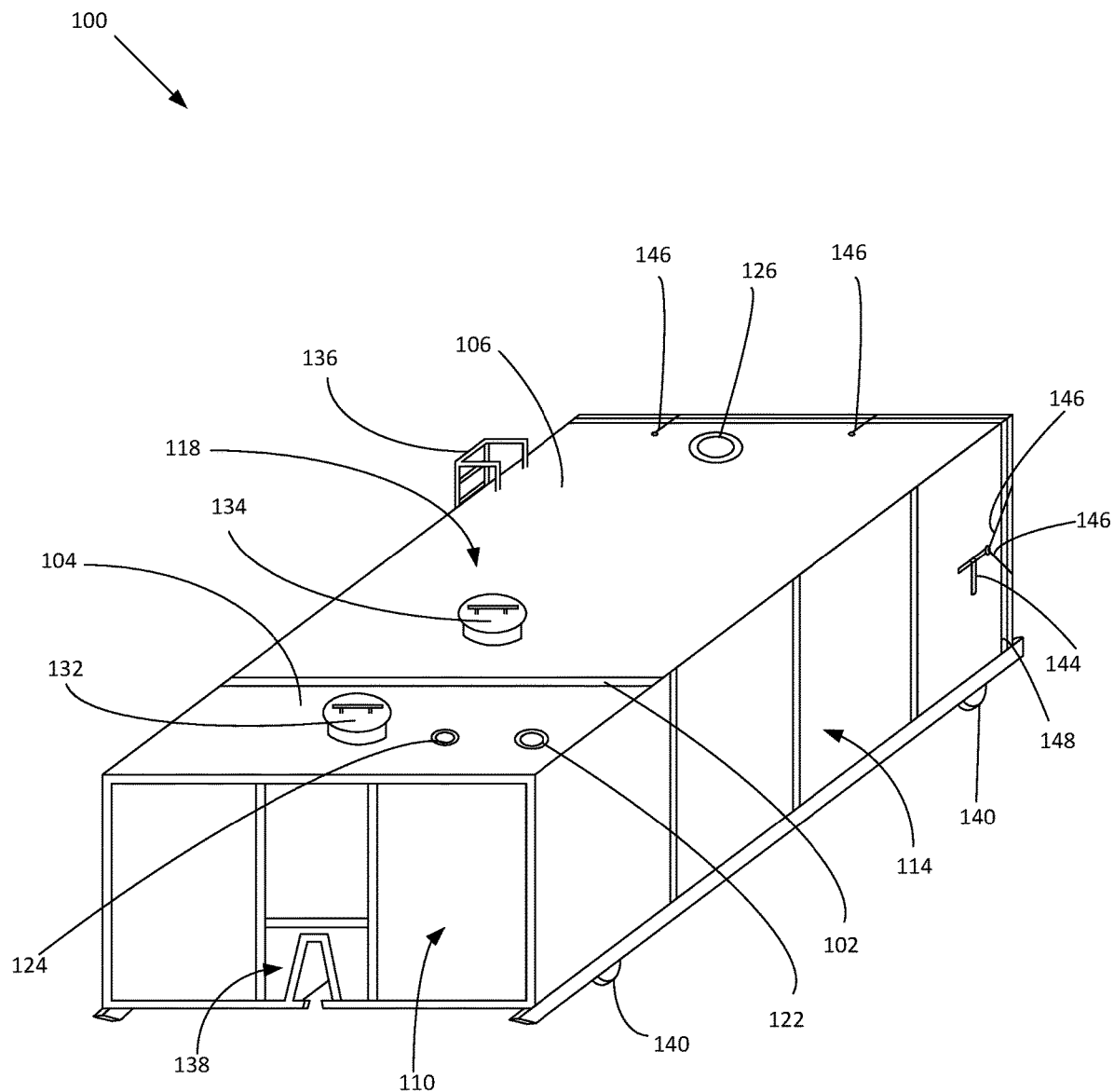
FIG. 2 is a perspective view of a storage vessel constructed in accordance with an exemplary embodiment.

Referring now to FIGS. 1 and 2, shown therein are perspective views of a storage vessel 100 constructed in accordance with an exemplary embodiment of the invention. In this embodiment, the storage vessel 100 has a body 102, a fluid section 104, a debris section 106, and a bulkhead 108. The body 102 of the storage vessel supports the storage vessel sections 104, 106 and the bulkhead 108. Ports, drains, and hatches are integrated into the body 102 to provide access to the fluid and debris which may be stored within the storage vessel 100.

The body 102 is constructed of steel or other rigid metal materials. The body 102 may be coated in a paint or sealant to prevent corrosion. The body 102 has a front panel 110, a back panel 112, a left panel 114, a right panel 116, a top panel 118, and a bottom panel 120 connected in a cuboid shape. It will be understood that in other embodiments the storage vessel may be constructed in other shapes such as a cylinder. In this exemplary embodiment, the panels are constructed together as one unitary piece; however, the invention is not so limited and in other embodiments portions of the body 102 may be removable or may open on a hinge to provide access to the sections of the storage vessel 100.

The fluid section 104 is positioned between the front panel 110 and the bulkhead 108. The fluid section 104 is configured to store excavation fluid 152 for use in a hydroexcavator. The fluid section 104 has a fluid fill port 122 configured to allow the fluid section 104 to be filled with excavation fluids 152, such as water. The storage vessel 100 also has a fluid load port 124. The fluid load port 124 provides a hydroexcavator with access to the excavation fluid 154 within the fluid section 104. The fluid load port 124 extends vertically downward into the fluid section 104. The vertical extension of the fluid load port 124 into the fluid section 104 allows a hydroexcavator to withdraw excavation fluid 154 from the bottom of the fluid section 104. In the exemplary embodiment the fluid fill port 122 and fluid load port 124 are integrated into the portion of the top panel 118 covering the fluid section 104 of the storage vessel 100. The fluid fill port 122 and fluid load port 124 may be integrated into other portions of the body 102 and the fluid load port 124 may not extend into the fluid section 104. In some embodiments, the fluid load port 124 and the fluid fill port 122 or other combinations of ports may be integrated into a single port.

In the exemplary embodiment shown in FIG. 1, the debris section 106 is positioned between the back panel 112 and the bulkhead 108. The debris section 106 is configured to store debris (not shown) that has been excavated with a hydroexcavator. The debris section 106 has a debris load port 126 which is configured to allow debris, such as mud, to flow from a hydroexcavator through the debris load port 126 and into the debris section. As illustrated, the debris load port 126 is integrated into the portion of the top panel 118 covering the debris section 106 of the storage vessel 100. The debris section 106 also has a drain port 128 and a skim port 130. The drain port 128 and skim port 130 are configured to allow debris to flow out of the debris section of the storage vessel through the ports 128, 130. To accommodate large debris which may have accumulated in the debris section 106, the drain port 128 may have a larger diameter than other ports integrated into the storage vessel 100. The portion of the bottom panel 120 located below the debris section 106 may be sloped toward the drain port 128 to promote the flow of debris to the drain port 128 when emptying the debris section 106.

Figure 3:
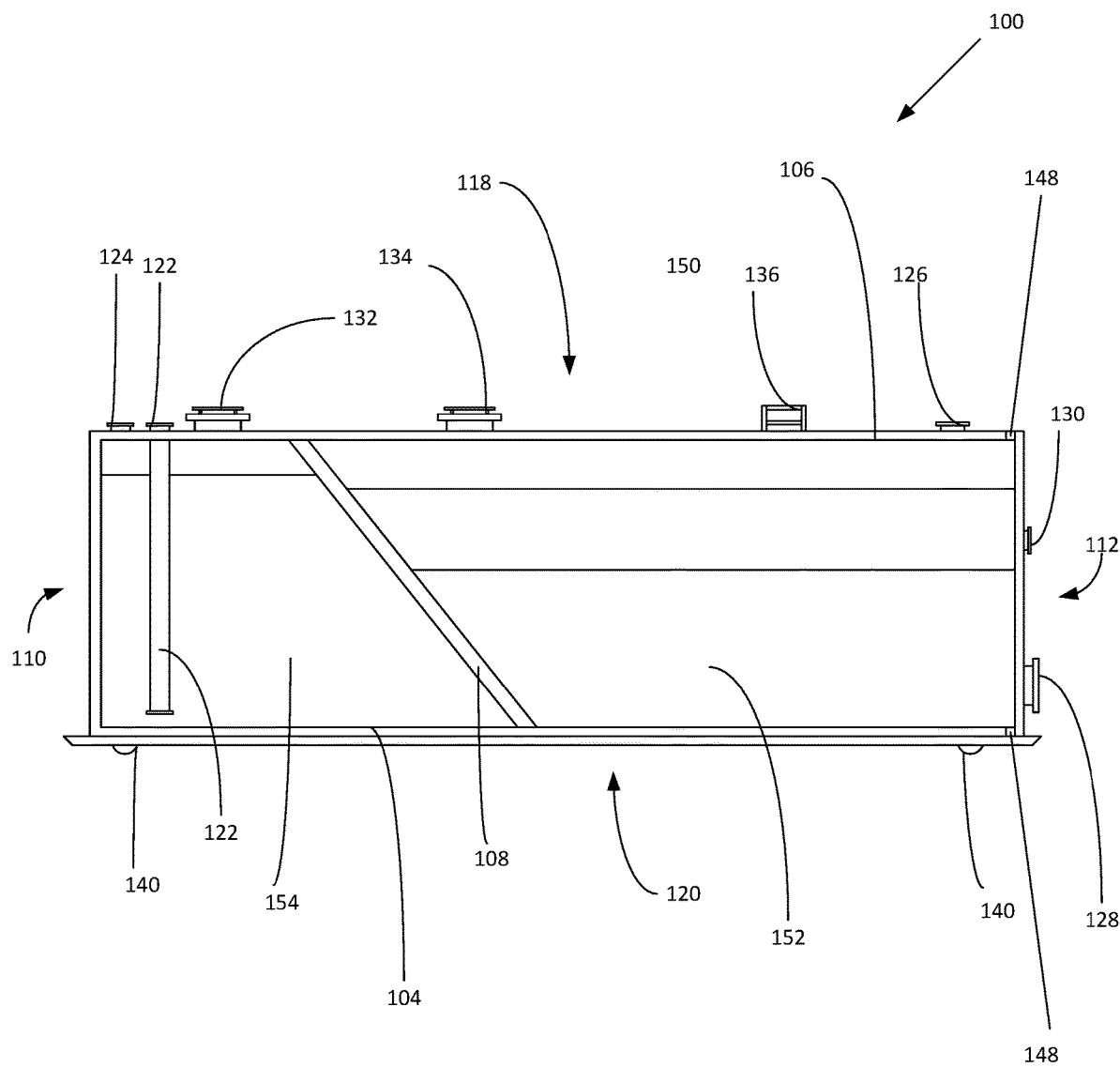
FIG. 3 is a cross-sectional side view of a storage vessel constructed in accordance with an exemplary embodiment.

The skim port 130 is positioned above the drain port 128. Debris from hydroexcavation stored within the debris section 106 may separate into layers. As shown in FIG. 3, debris may separate into a first debris layer 150 and a second debris layer 152 within the debris section 106. The skim port 130 allows the top or first debris layer 150 to be removed while leaving the bottom or second debris layer 152 within the debris section 106. The separation of the layers allows first and second layers 150, 152 to be independently removed or separately repurposed. Turning back to FIGS. 1 and 2, the drain port 128 and the skim port 130 are exemplified as integrated into the back panel 112. In other embodiments, the drain port 128 and skim port 130 may be integrated into other portions of the debris section 106 if the skim port 130 is located at a higher position than the drain port 128. In other embodiments, the storage vessel 100 may not include a skim port 130. To promote the emptying of debris from the debris section 106, the drain port 128 may be integrated into the body horizontally on the bottom panel 120 or may be integrated into the body at the lowest vertical position of the debris section 106.

The fluid section 104 may have a fluid section hatch 132 and the debris section 106 may have a debris section hatch 132. The hatches 132, 134 are integrated into the portions of the top panel 118 covering the respective section 104, 106. The hatches 132, 134 are configured to allow an operator to access the internal portion of the section 104, 106 through the hatch 132, 134. The hatches 132, 134 are generally sized larger than the ports integrated into the body 102 of the storage vessel 100. The larger sized hatch 132, 134 allows an operator to visually inspect the contents of the section 104, 106 and operate tools inside the section 104, 106 such as tools for cleaning the interior of the section 104, 106. In other embodiments fewer or additional hatches may be integrated into the body 102. In the illustrated embodiment, a ladder 136 is attached to the right panel 116. The ladder 136 would allow an operator to access the hatches and ports located on the top panel 118. The hatches and ports integrated into the body 102 may be opened or closed to access the sections 104, 106. The ports described herein may be configured with an attachment mechanism, such as a threaded collar to allow fluid or debris lines from a hydroexcavator to be quickly and easily attached to the ports. It will be understood that in other embodiments additional or fewer ports and hatches may be integrated into the body 102.

The storage vessel 100 has a roll off attachment apparatus 138 integrated into the front panel 110 and four wheels 140 attached to the bottom panel 120. The wheels 140 may be attached to a skid connected to the bottom panel 120. A cabled lift mechanism such wench and hydraulic lift incorporated into a motorized vehicle such as a truck (not shown) can be attached to the roll off attachment apparatus 110. The attached cabled lift mechanism can then be used to lift the storage vessel 100 onto the motorized vehicle for transportation. The wheels 140 attached to the bottom panel 120 decrease the load on the cabled lift mechanism and prevent damage to the bottom panel 120 when loading the storage vessel 100 onto the motorized vehicle. The wheels 140 also provide stable footing for the storage vessel 100 when it is dropped at an excavation site. It will be understood that in other embodiments the storage vessel 100 may be attached to a motorized vehicle with other sufficient attachment means such as a fifth wheel coupling.

Turning to FIG. 3 a cross-sectional side view of the storage vessel 100 of FIGS. 1 and 2 is shown. The storage vessel 100 contains an excavation fluid 154 contained within the fluid section 104 and a first 150 and second debris layer 152 contained within the debris section 106. The debris 150, 152 and the excavation fluid 154 are separated by the angled bulkhead 108. The cross-sectional view shows the angle of the bulkhead 108 within the storage vessel 100. The bulkhead 108 is sloped toward the drain port 128 to promote the flow of debris toward the drain port 128 when the debris section 106 is emptied. In other embodiments the bulkhead 108 and section of the bottom panel 120 under the debris section 106 may both be sloped to promote the flow of debris toward the drain port 128. The cross-sectional view also shows the extension of the fluid load port 124 into the fluid section 104. As described above the vertical extension of the fluid load port 124 into the fluid section 104 allows a hydroexcavator to withdraw excavation fluid 154 from the bottom of the fluid section 104.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

The description of the invention is intended to be read in connection with the accompanying drawings, which are to be considered part of the entire written description of this invention. In the description, relative terms such as "front," "rear," "lower," "upper," "horizontal," "vertical," "inward," "outward," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the device be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A storage vessel for storing excavated debris and excavation fluid, the storage vessel comprising:
    a body comprising a plurality of connected panels;
    a fluid section inside the body;
    a debris section inside the body;
    a bulkhead that separates the fluid section and the debris section within the body;
    a fluid fill port integrated into the body and connected to the fluid section;
    a fluid load port integrated into the body and connected to the fluid section, wherein the fluid load port extends vertically downward into the fluid section;
    a debris load port integrated into the body and connected to the debris section;
    a drain port integrated into the body and connected to the debris section; and
    a roll off attachment apparatus configured to attach the storage vessel to a motorized vehicle.

2. The storage vessel of claim 1 further comprising a skim port integrated into the body and connected to the debris section, wherein the skim port is positioned higher on the body than the drain port.

3. The storage vessel of claim 2 wherein the bulkhead is angled toward the drain port to promote the flow of debris toward the drain port.

4. The storage vessel of claim 3 further comprising a debris hatch integrated into the body and connected to the debris section, wherein the debris hatch has a larger opening than the debris load port.

5. The storage vessel of claim 4 further comprising a fluid hatch integrated into the body and connected to the fluid section, wherein the fluid hatch has a larger opening than the fluid load port.

6. The storage vessel of claim 5 further comprising a set of wheels connected to the bottom of the body.

7. The storage vessel of claim 3 wherein the fluid fill port and the fluid load port are the same port.

8. The storage vessel of claim 3 wherein the plurality of connected panels are constructed together as one unitary piece.

9. The storage vessel of claim 3 wherein one or more of the panels in the plurality of panels are removable.

10. The storage vessel of claim 3 wherein one or more of the panels in the plurality of panels open on a hinge.

11. The storage vessel of claim 3 wherein the drain port is integrated into the body at the lowest vertical position of the debris section.

12. A storage vessel for storing excavated debris and excavation fluid, the storage vessel comprising:
    a body, wherein the body comprises a plurality of connected panels;
    two or more sections inside the body, each section comprising:
        a load port integrated into the body and connected to a first section; and
        a hatch integrated into the body and connected to a second section;
    one or more bulkheads that separate sections within the body; and
    a roll off attachment apparatus configured to attach the storage vessel to a motorized vehicle.

13. The storage vessel of claim 12 wherein the first section further comprises a drain port.

14. The storage vessel of claim 13 wherein the first section further comprises a skim port.

15. The storage vessel of claim 14 wherein a first bulkhead is angled toward the drain port of the first section to promote the flow of debris toward the drain port.

16. The storage vessel of claim 15 wherein the hatches have a larger opening than the load ports.

17. The storage vessel of claim 16 further comprising a set of wheels connected to the bottom of the body.

18. The storage vessel of claim 17 wherein the plurality of connected panels are constructed together as one unitary piece.

19. The storage vessel of claim 17 wherein one or more of the panels in the plurality of panels are removable.

20. The storage vessel of claim 17 wherein one or more of the panels in the plurality of panels open on a hinge.

* * * * *